(12) United States Patent
Perone et al.

(10) Patent No.: US 9,918,346 B2
(45) Date of Patent: Mar. 13, 2018

(54) SYSTEM FOR CONNECTING, SECURING AND MANAGING NETWORK DEVICES WITH A DEDICATED PRIVATE VIRTUAL NETWORK

(71) Applicant: BARRACUDA NETWORKS, INC., Campbell, CA (US)

(72) Inventors: Michael Perone, Saratoga, CA (US); Fleming Shi, Scotts Valley, CA (US)

(73) Assignee: BARRACUDA NETWORKS, INC., Campbell, CA (US)

( * ) Notice: Subject to any disclaimer, the term of this patent is extended or adjusted under 35 U.S.C. 154(b) by 90 days.

(21) Appl. No.: 15/130,923

(22) Filed: Apr. 15, 2016

(65) Prior Publication Data

US 2016/0309395 A1 Oct. 20, 2016

Related U.S. Application Data

(60) Provisional application No. 62/149,274, filed on Apr. 17, 2015.

(51) Int. Cl.
*H04L 12/26* (2006.01)
*H04W 76/02* (2009.01)
*H04L 12/46* (2006.01)
*H04W 48/12* (2009.01)
*H04W 88/16* (2009.01)

(52) U.S. Cl.
CPC ....... *H04W 76/021* (2013.01); *H04L 12/4641* (2013.01); *H04W 48/12* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 9,548,935 B2 * | 1/2017 | Short | H04L 63/08 726/1 |
| 2002/0056008 A1 * | 5/2002 | Keane | H04L 61/00 709/245 |
| 2006/0018300 A1 * | 1/2006 | Westberg | H04L 12/4641 370/351 |
| 2009/0089874 A1 * | 4/2009 | Mohanty | H04L 12/4641 726/15 |

(Continued)

*Primary Examiner* — Anh-Vu Ly
(74) *Attorney, Agent, or Firm* — Duane Morris LLP

(57) ABSTRACT

A device includes a database, a controller, and a PVN router. The database is configured to store network settings information and tracks devices connected to a network. The controller is configured to control access of devices to one another after establishing a connection to the network. The PVN router is configured to receive a provisioning request from a requesting to connect to the network. The PVN router is further configured to transmit a provisioning response to the requesting device based on instantiation of a PVN template received from the database. The PVN template is generated based on the network settings information and further based on the control access determined by the controller. The provisioning response establishes a connection between the requesting device and the network. The requesting device is inaccessible by a subset of devices already connected in the network after the connection is established and vice versa.

28 Claims, 10 Drawing Sheets

(56) References Cited

U.S. PATENT DOCUMENTS

| | | | | |
|---|---|---|---|---|
| 2009/0147772 | A1* | 6/2009 | Rao | H04L 12/1818 370/352 |
| 2010/0080238 | A1* | 4/2010 | Allan | H04L 12/4662 370/401 |
| 2010/0260187 | A1* | 10/2010 | Ongole | H04L 12/4641 370/395.53 |
| 2011/0035795 | A1* | 2/2011 | Shi | H04L 43/026 726/13 |
| 2012/0023554 | A1* | 1/2012 | Murgia | H04L 63/102 726/4 |
| 2013/0298182 | A1* | 11/2013 | May | H04L 63/0272 726/1 |
| 2014/0181895 | A1* | 6/2014 | Kelly | H04L 63/102 726/1 |
| 2014/0280809 | A1* | 9/2014 | Li | H04L 41/0806 709/222 |
| 2014/0309806 | A1* | 10/2014 | Ricci | B60Q 1/00 701/1 |
| 2014/0309870 | A1* | 10/2014 | Ricci | H04W 48/04 701/36 |
| 2014/0325037 | A1* | 10/2014 | Elisha | H04L 41/0806 709/220 |
| 2016/0294728 | A1* | 10/2016 | Jain | H04L 47/82 370/352 |
| 2017/0149736 | A1* | 5/2017 | Black | H04L 63/0263 726/1 |

* cited by examiner

US 9,918,346 B2

SYSTEM FOR CONNECTING, SECURING AND MANAGING NETWORK DEVICES WITH A DEDICATED PRIVATE VIRTUAL NETWORK

RELATED APPLICATIONS

This application claims the benefit of and priority to the U.S. provisional patent application No. 62/149,277, filed on Apr. 17, 2015, and is incorporated in its entirety by reference.

BACKGROUND

In recent years there has been an increase in demand for connecting electronic devices to the network. However, providing network access while securing the devices that are connected to the network has been challenging. One of the challenges with today's technology is that devices share the network space regardless of whether they are on the guest network or authenticated network. For example, there are no simple methods to provide Internet access to devices while preventing the devices from interfering with one another, e.g., having access to one another.

A virtual local area network (VLAN) may be used to physically separate networks. However, use of VLAN is complicated and cumbersome to manage and it often requires an expert like an IT individual.

SUMMARY

Accordingly, a need has arisen to provide Internet access to devices that connect to the network but at the same time provide the necessary security and privacy between the devices. According to some embodiments, a dedicated private virtual network (PVN) may be used for each device that wishes to connect to the network. The dedicated PVN is configured such that the requesting device is inaccessible by other devices on the network or a subset thereof, and that other devices on the network or a subset thereof are inaccessible by the requesting device, depending on the access control configuration. It will become apparent to those skilled in the art after reading the detailed description that the embodiments described herein satisfy the above mentioned needs.

According to one embodiment, a device includes a database, a controller, and a private virtual network (PVN) router. The database may be configured to store network settings information and further configured to track devices connected to a network. The controller may be configured to control access of devices to one another after establishing a connection to the network. The PVN router may be configured to receive a provisioning request from a requesting device to connect to the network. The PVN router may be further configured to transmit a provisioning response to the requesting device based on instantiation of a PVN template received from the database. In some embodiments, the PVN router may be further configured to automatically discover new devices.

The template may be generated based on the network settings and further based on the control access determined by the controller. It is appreciated that the template may include information regarding an internet protocol, subnet size, default gateway, routing tables, and domain name system services. According to some embodiments, the provisioning response establishes a connection between the requesting device and the network. In some embodiments, the requesting device is inaccessible by a subset of devices already connected in the network after the connection is established and wherein the subset of devices is inaccessible by the requesting device after the connection is established.

It is appreciated that the requesting device is accessible by another subset of devices already connected in the network after the connection is established. According to some embodiments, the another subset of devices may be accessible by the requesting device after the connection is established. It is appreciated that the requesting device may be invisible to the subset of devices and that the subset of devices may be invisible to the requesting device. In some embodiments, presence of the requesting device remains unknown by the subset of devices after the connection is established, and wherein presence of the subset of devices remains unknown by the requesting device after the connection is established In some embodiments, the controller may be configurable in response to receiving instructions from a network administrator to modify accessibility of the requesting device to the subset of devices and vice versa prior to establishing the connection.

It is appreciated that the PVN router may be configured to receive a request from the requesting device, after the connection is established, to grant access to another device connected to the network that is not in the subset of devices. According to some embodiments, the controller may be configured to determine whether the requesting device should be given access to the another device connected to the network that is not in the subset of devices. It is appreciated that in some embodiments, the controller is configured to provide access to the requesting device in response to determining that the requesting device should be given access to the another device connected to the network that is not in the subset of devices.

BRIEF DESCRIPTION OF DRAWINGS

The embodiments are illustrated by way of example, and not by way of limitation, in the figures of the accompanying drawings and in which like reference numerals refer to similar elements.

FIG. 10 shows an exemplary PVN template to instantiate active PVN according to some embodiments.

DETAILED DESCRIPTION

Figure 1A:
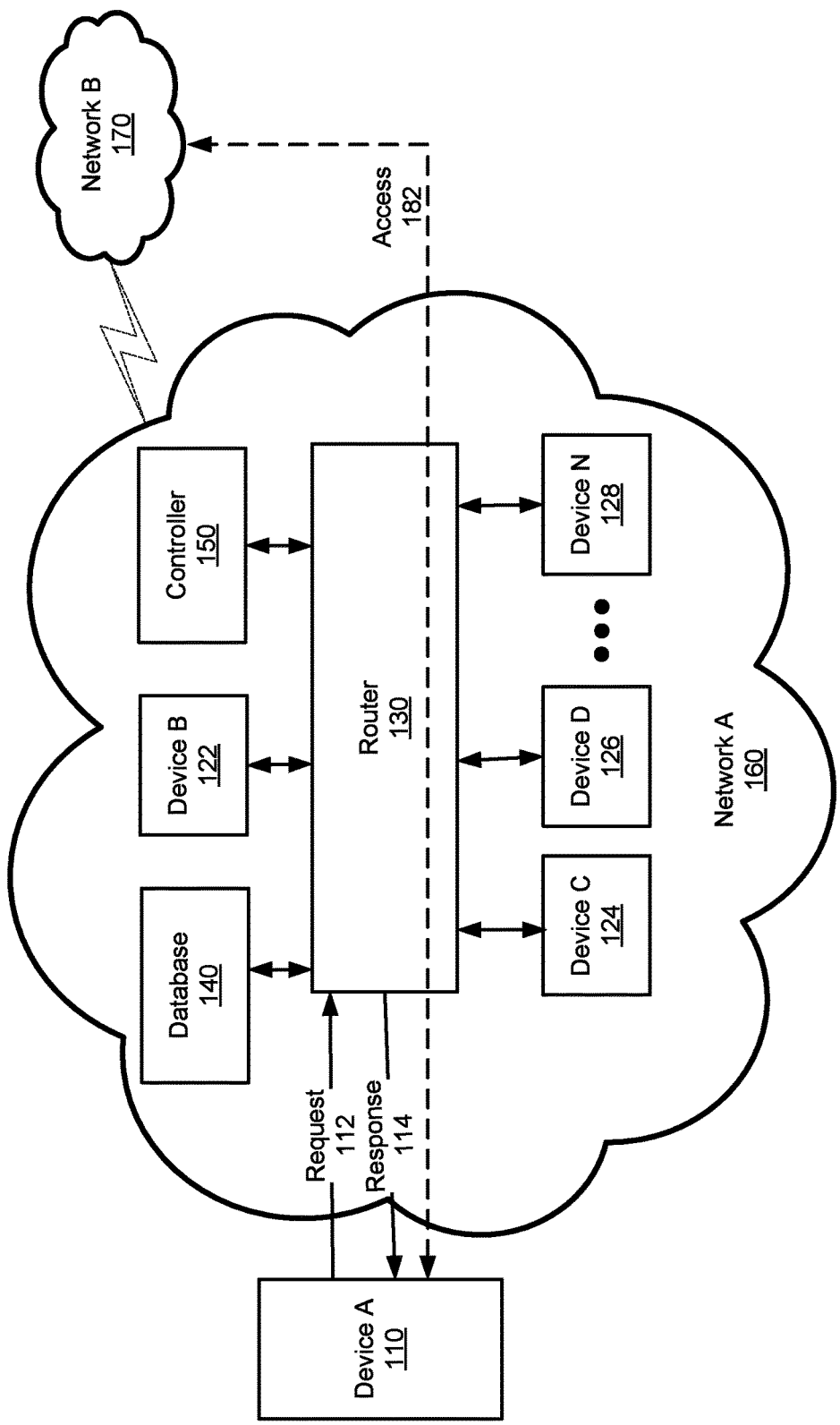
FIG. 1A shows a device connecting to a network where the device remains inaccessible to other devices within the network and vice versa in accordance with some embodiments.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "determining," "sending," "receiving," "transmitting," "communicating," "providing," "accessing," "associating," "disabling," "enabling," "configuring," "initiating," "starting," "terminating," "ending," "maintaining," "detecting," "establishing," "connecting," "granting" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

A need has arisen to provide Internet access to devices that connect to a network but at the same time provide the necessary security and privacy between the devices. According to some embodiments, a dedicated private virtual network (PVN) may be used for each device that wishes to connect to the network. The dedicated PVN is configured such that the requesting device is inaccessible by other devices on the network or a subset thereof, and that other devices on the network or a subset thereof are inaccessible by the requesting device, depending on the access control configuration. It is appreciated that in some embodiments, upon request for greater accessibility the controller may grant or deny greater access between connected devices.

Referring now to FIG. 1A, a device connecting to a network where the device remains inaccessible to other devices within the network and vice versa in accordance with some embodiments is shown. Device A 110 is shown that is seeking to connect to network A 160.

Network A 160 may include device B 122, device C 124, device D 126, . . . , device N 128 that may be coupled to a router 130, a controller 150 and a database 140. It is appreciated that the router 130, the database 140, and the controller 150 may be part of the network A 160. Moreover, it is appreciated that the database 140 may be a memory component that is configured to store various information and references to a database are for illustrative purposes only and not intended to limit the scope of the embodiments. It is also appreciated that the controller 150 may be a processing unit, e.g., a processor such as a central processing unit, a field programmable gate array (FPGA), application specific integrated circuit (ASIC), etc., configured to control the operation of the router 130, and the database 140, etc. For example, the controller 150 may be configured to control access to network A 160. Network A 160 may be coupled to other networks, e.g., network B 170, Internet, etc.

In some embodiments, the device A 110, device B 122, device C 124, device D 126, . . . , device N 128 may be any electronic device, e.g., a printer, scanner, a laptop, a PC, a private network stack, a set-top-box, Apple TV, gaming console, storage appliances, Internet-enabled gadgets and appliances for controlling lighting, entertainment, and security, a mobile device such as an iPhone, iPad, Android phones, Android tablets, etc. According to some embodiments, the router 130 may be a PVN router.

In some embodiments, device A 110 transmits a requesting signal 112 to the router 130 requesting to connect to network A 160. It is appreciated that the request may be transmitted through any suitable means, e.g., optical means, wired, wireless, etc. The request 112, in one embodiment, may be a provisioning request.

The router 130 that is controlled by the controller 150 may access the database 140 to access information stored therein, e.g., a template that includes the network settings. For example, the template may include profiles PVN properties such as Internet Protocol, subnet size, default gateway, routing tables, domain name server (DNS) services, etc. The database 140 may track devices that are connected in network A 160 and it may host the PVN templates.

It is appreciated that the controller 150 may be configured, e.g., by a network administrator, to have a default setting for controlling the database 140 and the router 130. The default setting may include policies regarding device accessibility, etc. For example, the policy may be whether an external device that is seeking to connect to the network would have access to any device within the network and vice versa. The policy in some embodiments may be whether an external device that is seeking to connect to the network would have access to a subset of devices within the network and vice versa. It is appreciated that in some embodiments, the policy may include the level of access to any given device, e.g., full access, limited access, etc., and vice versa.

For illustrative purposes in this embodiment it is presumed that the default policy is that the external device, e.g., device A 110, that is seeking to connect to the network, e.g., network A 160, should have no access to devices, e.g., device B 122, device C 124, device D 126, . . . , device N 128, connected to the network A 160 and vice versa. Accordingly, the router 130 after receiving the request 112 and under the control of the controller 150 accesses the database 140 and obtain the network settings, e.g., a template that includes PVN properties such as Internet Protocol, subnet size, default gateway, routing tables, domain name server (DNS) services, policies associated with access, etc. The router 130 under the control of the controller 150 and after receiving the network settings generates a dedicated PVN for device A 110 to be used. In other words, the system, e.g., the router 130 along with the database 140, and the controller 150, may instantiate a new dedicated PVN for device A 110. The database 140 tracks the dedicated PVN assigned to device A 110 and the router 130 transmits a response 114 to device A 110. The response 114 may include the dedicated PVN, the network settings, the template, or any combination thereof.

In response to receiving the response 114, the device A 110 establishes a connection to network A 160 and therefore to network B 170, which may be the Internet, e.g., through access route 182. However, since the default policy as controlled by the controller 150, in this instance, is that any external device connecting to the network A 160 should have no access to devices in the network A 160 and vice versa, the device A 110 is given no access to device B 122, device C 124, device D 126, . . . , device N 128 and vice versa. In other words device A 110 may be invisible, remain invisible, and have no access to device B 122, device C 124, device D 126, . . . , device N 128 and vice versa. As such, a complete separation may be provided between device A 110, device B 122, device C 124, device D 126, . . . , device N 128.

Accordingly, dedicated PVN for each device connecting to the network A 160 may be used to improve security of devices connected thereto while simplifying network settings for connecting external devices to the network. In other words, each external device connecting to the network may have its own dedicated PVN that isolates it from other devices in the same network, thereby improving security of the system as well as simplifying accessibility and network settings.

It is appreciated that the specific numbers of devices, router, database, controller, etc., as discussed is only for illustrative purposes and any number or combination thereof may be used.

Figure 1B:
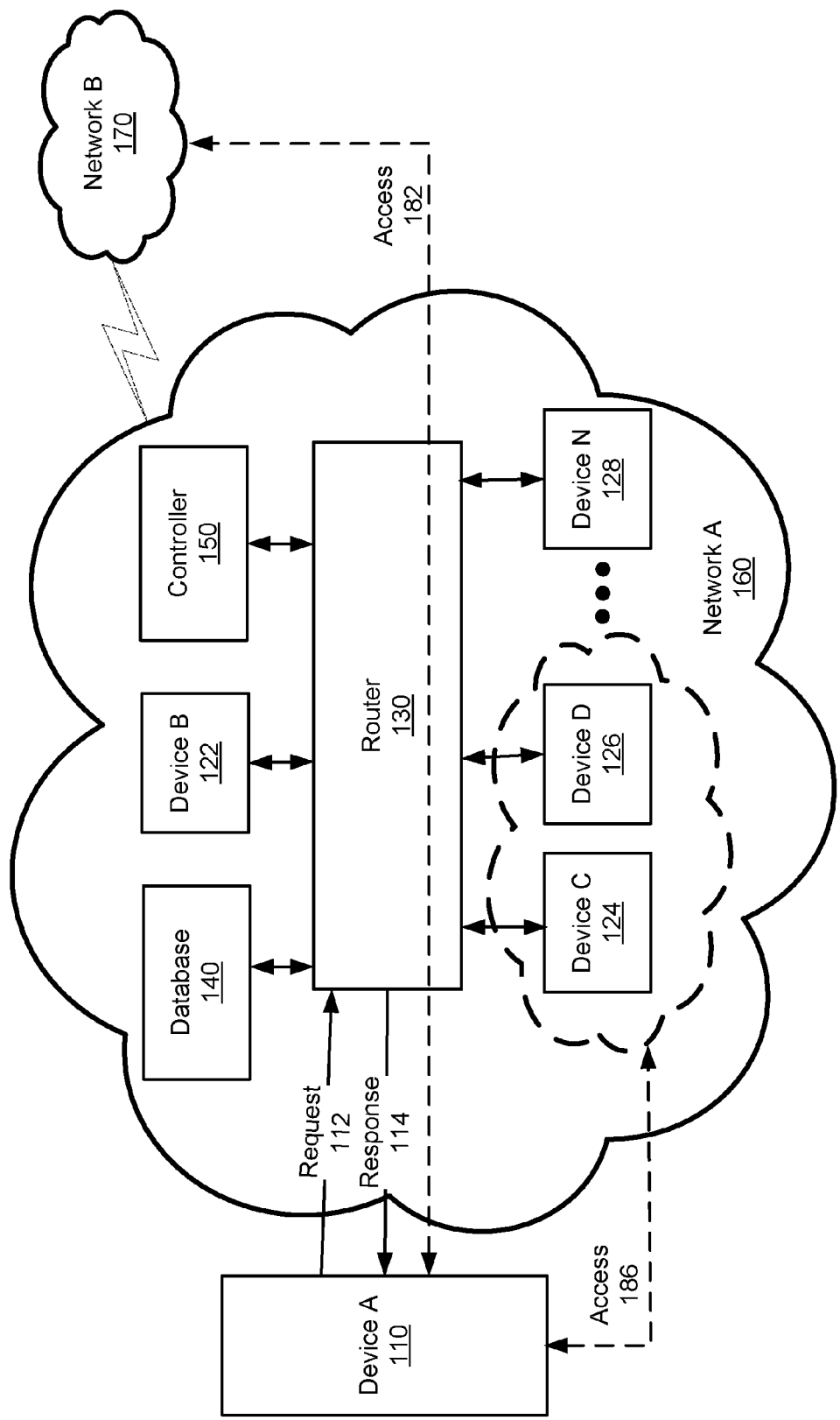
FIG. 1B shows a device connecting to a network where the device remains inaccessible to a first subset of devices within the network and vice versa in accordance with some embodiments.
Figure 1C:
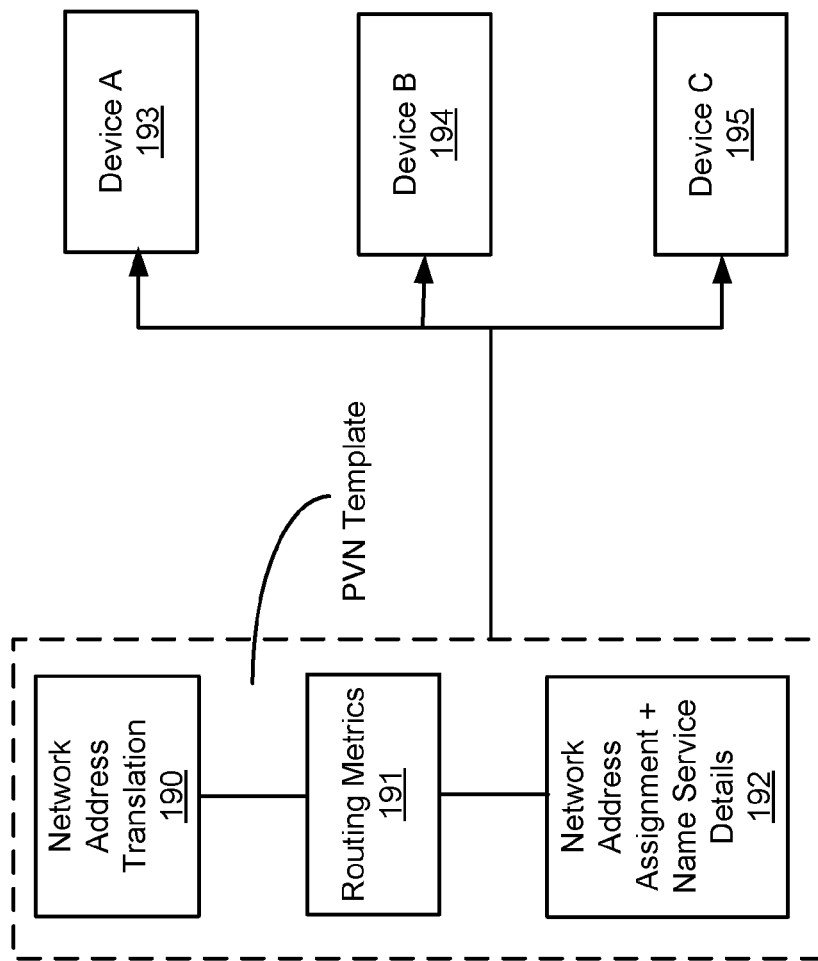

Referring now to FIG. 1B, a device connecting to a network where the device remains inaccessible to a first subset of devices within the network and vice versa in accordance with some embodiments is shown. FIG. 1B is substantially similar to FIG. 1A except that the default policy regarding access among devices is different from that of FIG. 1A. In this embodiment, the controller 150 may have a default policy or a modified policy by a network administrator such that any external device such as device A 110 seeking to connect to network A 160 can access a subset of devices in the network A 160 and vice versa. For example, the default policy may be that device A 110 may have access to a subset of devices in network A 160, e.g., device C 124 and device D 126, and vice versa after a connection is established. For example, after device A 110 receives the response signal 114 and the dedicated PVN, a connection between device A 110 and network A 160 is established. Once a connection is established, device A 110 may have access to device C 124, and device D 126 and vice versa. However, other devices, e.g., device B 122 and device N 128, in network A 160 may remain inaccessible to device A 110 and vice versa. It is appreciated that the level of access may also be configurable, e.g., full access, limited access, etc.

In some embodiments, device B and device N 128 remain invisible and inaccessible to device A 110 and vice versa while device C 124 and device D 126 are accessible by device A 110 and vice versa. It is appreciated that in some embodiments, device B 122 and device N 128 remain inaccessible and/or invisible to device C 124 and device D 126 and vice versa.

Accordingly, device A 110 may connect to network A 160 and access network B 170 while a subset of devices in network A 160 remain inaccessible to device A 110 and vice versa. Moreover, device C 124 and device D 126 may be accessible to device A 110 and vice versa after a connection between device A 110 and the network A 160 is established through the dedicated PVN. Thus, security of devices in the network is improved while simplifying network settings for connecting external devices to the network. In other words, each external device connecting to the network may have its own dedicated PVN that isolates it from a subset of devices in the same network, thereby improving security of the system as well as simplifying accessibility and network settings. It is also appreciated that the use of dedicated PVN enables the level of accessibility, e.g., no access to limited access to full access, etc.

Referring now to FIG. 10 an exemplary PVN template to instantiate active PVN according to some embodiments is shown. According to some embodiments, the PVN template may include a network address translation 190, routing metrics 191, and network address assignment and name service details 192. It is appreciated that a homogenous number of PVN stacks may be generated within a router such that the network address assignment and name service details generated by the network address assignment and name service details 192 component and the routing metrics generated by the routing metrics 191 unit are the same for all devices, e.g., devices A-C 193-195. It is appreciated that the network address translation generated by the network address translation 190 component, however, may be unique to each device, e.g., devices A-C 193-195. As such, the LAN IP address and the routing behavior of all devices are the same except for when a device hops between the PVN router IP and the egress of the entire network.

Figure 2:
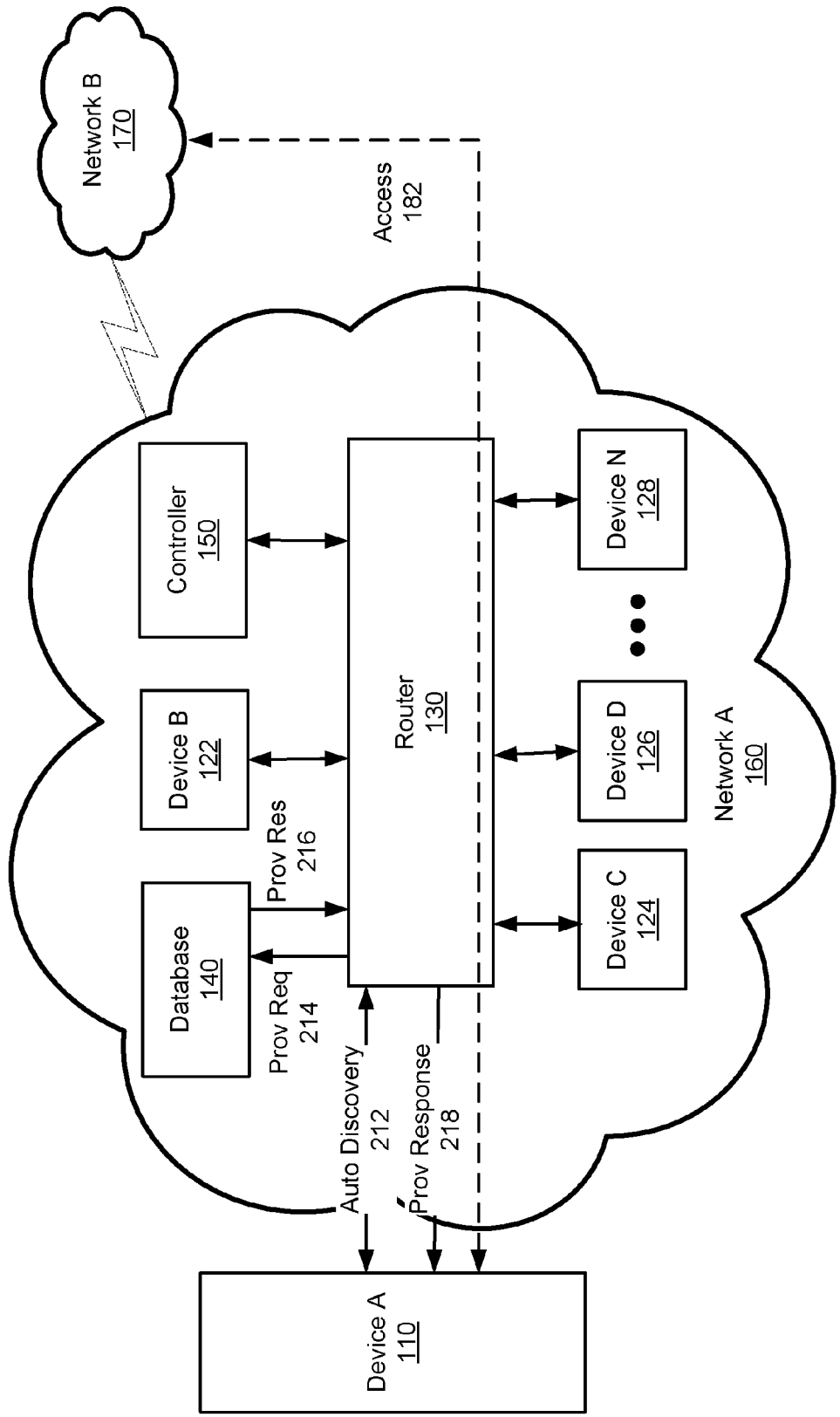
FIG. 2 shows an auto discovery of a device connecting to a network in accordance with some embodiments.

Referring now to FIG. 2, an auto discovery of a device connecting to a network in accordance with some embodiments is shown. FIG. 2 is substantially similar to that of FIG. 1A. However, in this embodiment, device A 110 is automatically discovered by the router 130 through the auto discovery 212 signal. As such, the provisioning request 214 may be generated and transmitted from the router 130 to the database 140 and a provisional response 216 from the database 140 may be received by the router 130. The provisional response 218 may subsequently be transmitted from the router 130 to the device A 110 in order to establish a connection between the device A 110 and the network A 160. It is appreciated that the provisioning request and response, as discussed in FIG. 2, may be substantially similar to those of FIGS. 1A-1B.

Figure 3:
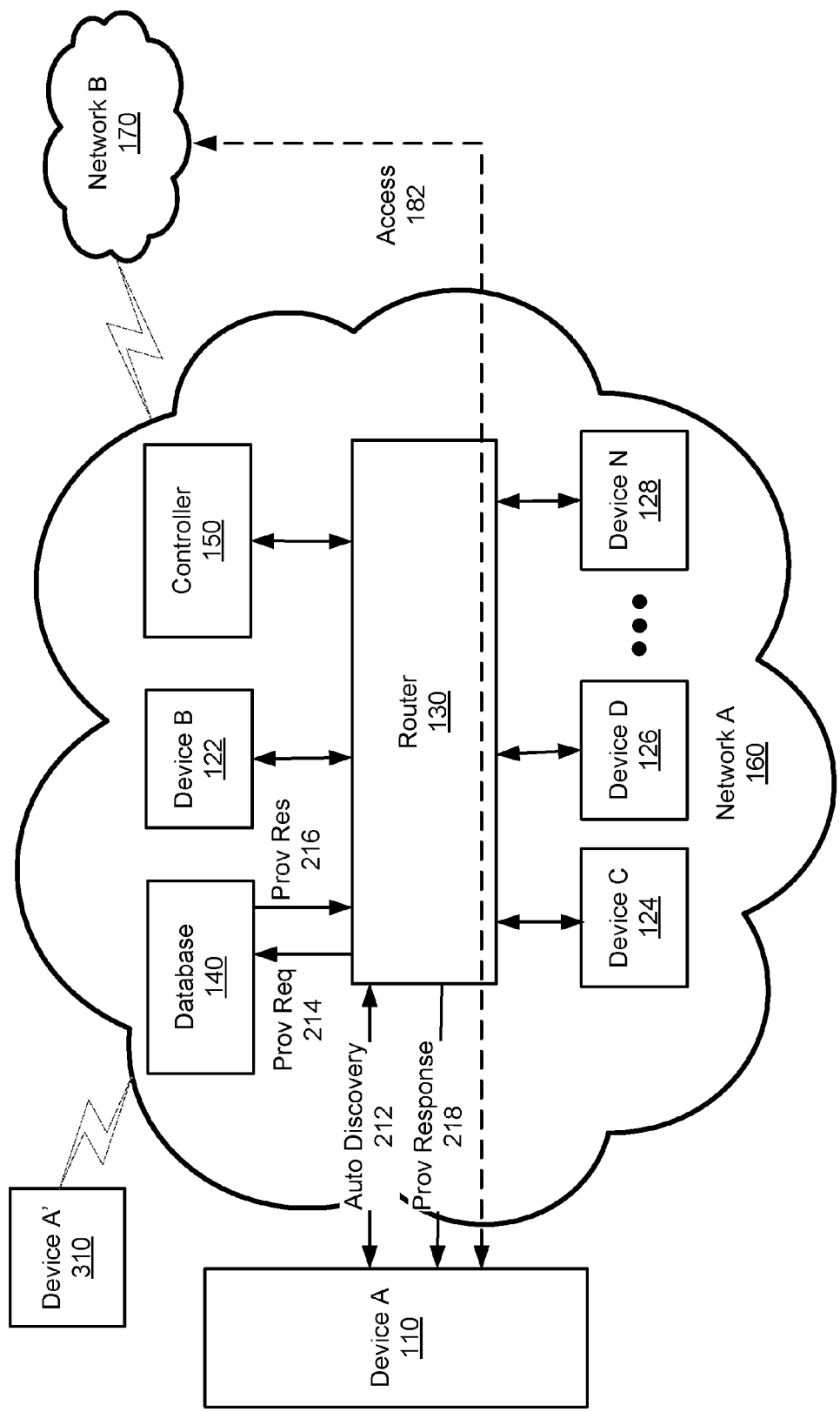
FIG. 3 shows an additional device connecting to the network as shown in FIG. 2.

Referring now to FIG. 3, an additional device connecting to the network as shown in FIG. 2 is shown. FIG. 3 is substantially similar to that of FIG. 2. In this embodiment, however, after device A 110 is connected to network A 160, an additional external device A' 310 seeks to connect to the network A 160. Device A' 310 may go through similar process, as described above with respect to FIGS. 1A-1B and FIG. 2, in order to connect to the network A 160 in similar fashion. It is appreciated that the default policy for accessibility with respect to device A' 310 may or may not be the same as that of device A 110. For example, accessibility may be configured based on various heuristics. In some embodiments, accessibility may be configured differently based on device type, IP location, user authentication, etc.

Figure 4:
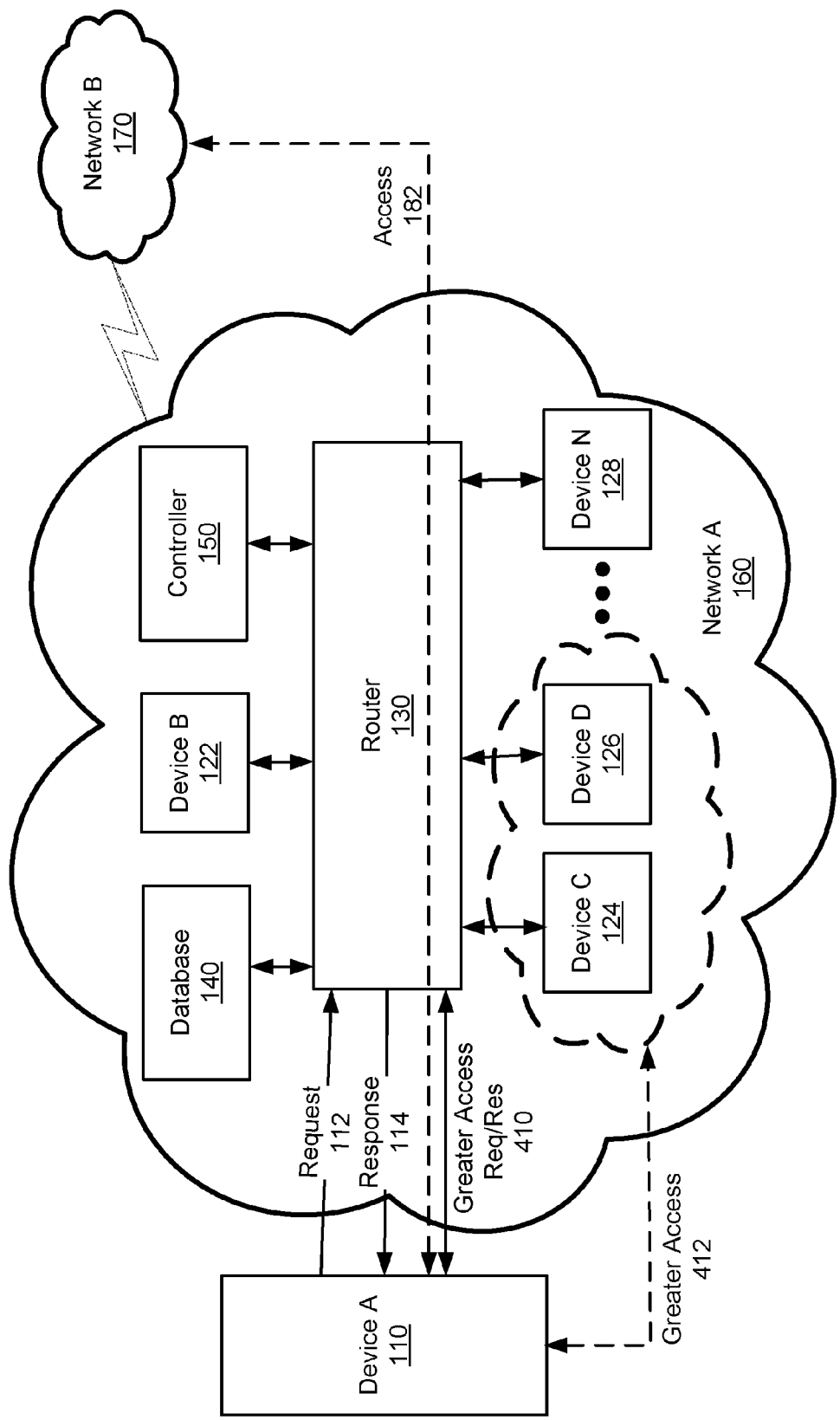
FIG. 4 shows a device connecting to a network and after establishing a connection requesting greater access to the network in accordance with some embodiments.

Referring now to FIG. 4, a device connecting to a network and after establishing a connection requesting greater access to the network in accordance with some embodiments is shown. FIG. 4 is substantially similar to that of FIG. 1A. However, after the connection is made between device A 110 and the network A 160, device A 110 may request to gain greater access to the network A 160, e.g., to access device C 124 and device D 126 that were previously inaccessible and vice versa based on the default policy.

In some embodiments, device A 110 may transmit the greater access request 410 to the router 130. The controller 150 may determine whether greater access should be granted. For example, the controller 150 may determine that greater access should be granted to a subset of devices, e.g., device C 124 and device D 126 and vice versa. Moreover, the controller 150 may determine the level of access, e.g., full access, limited access, etc. It is appreciated that the determination of whether greater access to the requesting device should be granted may be based on previously criteria specified by the network administrator, or in response to the manual command by the network administrator, or based on some heuristics.

Once the determination of whether greater access should be granted is made, the controller 150 controls the router 130 to transmit the response of greater access request 410 to the device A 110. In some embodiments, the response may include a modified dedicated PVN. Once the response is received by the device A 110, device A 110 may have greater access 412 to the subset of devices, e.g., device C 124 and device D 126, and vice versa.

Figure 5:
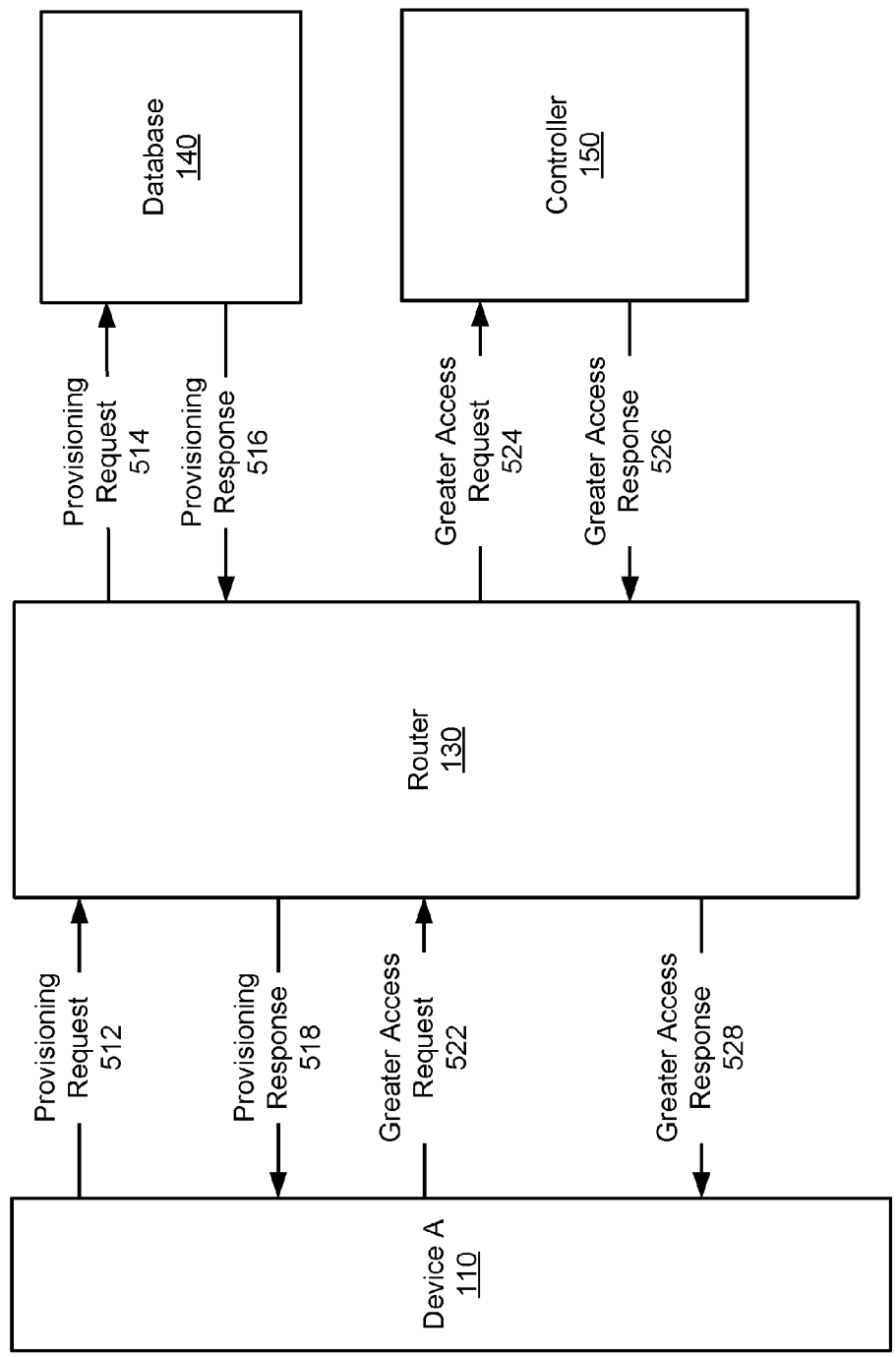
FIG. 5 shows a communication flow in a system in accordance with some embodiments.

Referring now to FIG. 5, a communication flow in a system in accordance with some embodiments is shown. Device A 110, router 130, database 140, and controller 150 operate substantially similar to that of FIGS. 1A-4, as were described above.

Device A 110 may transmit a provisioning request 512 to the router 130. The router 130 may in turn contact the database 140 to access information stored therein, e.g., a template that includes the network settings. For example, the template may include profiles PVN properties such as Internet Protocol, subnet size, default gateway, routing tables, domain name server (DNS) services, etc. The database 140 may transmit the network settings, e.g., a template that includes PVN properties such as Internet Protocol, subnet size, default gateway, routing tables, domain name server (DNS) services, policies associated with access, etc. The router 130 under the control of the controller 150 and after receiving the network settings generates a dedicated PVN for device A 110 to be used. In other words, the system, e.g., the router 130 along with the database 140, and the controller 150, may instantiate a new dedicated PVN for device A 110. The database 140 tracks the dedicated PVN assigned to device A 110 and the router 130 transmits a provisioning response 518 to device A 110. The response 518 may include the dedicated PVN, the network settings, the template, or any combination thereof.

In response to receiving the response 518, the device A 110 establishes a connection to network associated with the router 130 and thus to other networks that the connected network is coupled to, e.g., Internet. The connection between Device A 110 and the router 130 is established based on the access policies. For example, the policy as controlled by the controller 150 may be that any external device connecting to the network through the router 130 should have no access to devices in the network and vice versa. In other words device A 110 may be invisible, remain invisible, and have no access to other devices that are connected to the router 130 and vice versa. As such, a complete separation may be provided between device A 110 and other devices of the network. As another example, the policy as controlled by the controller 150 may be that any external device connecting to the network through the router 130 should have no access to a first subset of device while having limited access to a second subset of device while having full access to a third subset of device, and vice versa. In other words device A 110 may be invisible, remains invisible, and have no access to the first subset of devices while it has different levels of accessibility to other subset of devices, and vice versa.

Device A 110 may transmit a greater access request 522 to request a greater access to some or all of the devices connected through the router 130. The router 130 may transmit the greater access request 524 to the controller 150. The controller 150 may determine whether or not the request for greater access should be granted. The controller 150 based on network administrator's command and/or preprogrammed heuristics may then determine whether the greater request response should be granted.

The controller 150 transmits the greater access response 526 based on its determination to the router 130 which subsequently transmits the greater access response 528 to device A 110. Device A 110 is provided with greater access if the controller 150 has determined that a greater access request should be granted or its request for greater access is denied if the controller 150 has determined that a greater access request should be denied. It is appreciated that the controller 150 may determine a subset of devices and/or level of greater access that should be granted to device A 110 in some embodiments.

Accordingly, dedicated PVN for each device connecting to the network may be used to improve security of devices connected thereto while simplifying network settings for connecting external devices to the network. In other words, each external device connecting to the network may have its own dedicated PVN that isolates it from other devices in the same network, thereby improving security of the system as well as simplifying accessibility and network settings.

Figure 6:
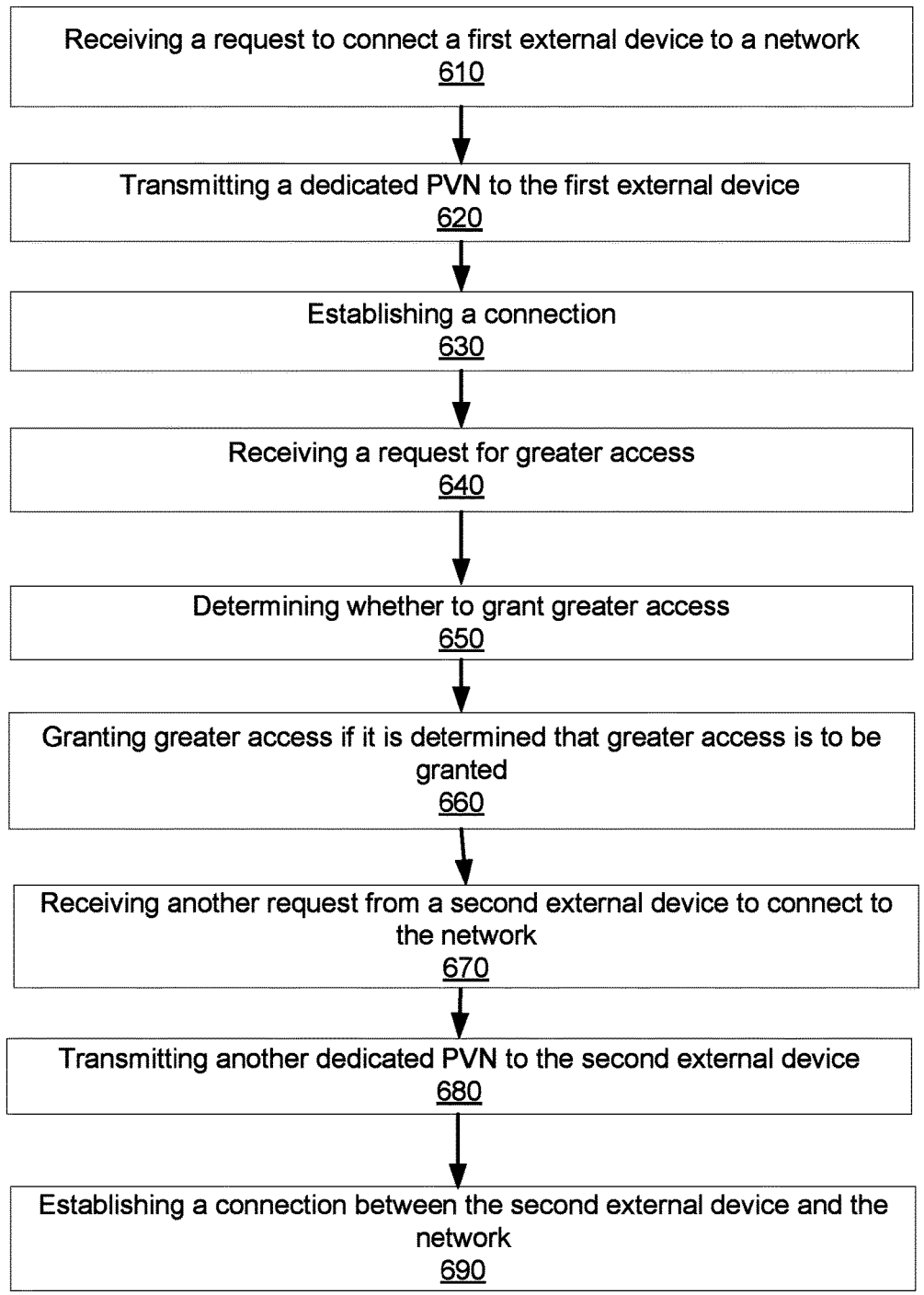
FIG. 6 shows a flow diagram in accordance with some embodiments.

Referring now to FIG. 6, a flow diagram in accordance with some embodiments is shown. At step 610, a request to connect a first external device to a network is received. The request may be a provisioning request in some embodiments. In some embodiments, the request may be auto-discovery of the external device when it is within the range of the router.

At step 620, a dedicated PVN is generated and transmitted to the first external device. The dedicated PVN may be generated based on network settings as well as policies associated with accessibility between the first external device and devices already connected in the network. For example, the policy may be that the external device should have no access to any of the devices within the network and vice versa. In some embodiments, the policy may be that the external device should have limited access to a subset of devices within the network and vice versa. In some embodiments, the policy may be that the external device should have full access to a subset of devices within the network and vice versa. It is appreciated that the policy may also be a combination of the exemplary embodiments described above.

At step 630, a connection between the first external device and the network is established. As such, the first external device now becomes part of the network and may be coupled to other networks, e.g., Internet.

At step 640, a request for greater access may be received from the first external device. At step 650, it is determined whether greater access should be granted and at step 660 greater access is granted to the first external device if it is determined that greater access should be granted. It is appreciated that greater access may be access to a subset of device, whether the access is limited access or full access or a combination thereof.

At step 670 another request to connect to the network is received from a second external device. It is appreciated that the request may be a provisioning request or it may be based on auto-discovery of the second external device when it is within the range of the router for the network.

At step 680, another dedicated PVN is generated and transmitted to the second external device. It is appreciated that the another dedicated PVN for the second external device is different from the dedicated PVN of the first external device in order to control their respective accessibilities separately and also in order to isolate each of them based on the level of isolation desired from other devices within the network. A connection between the second external device and the network is established based on the another dedicated PVN.

Figure 7:
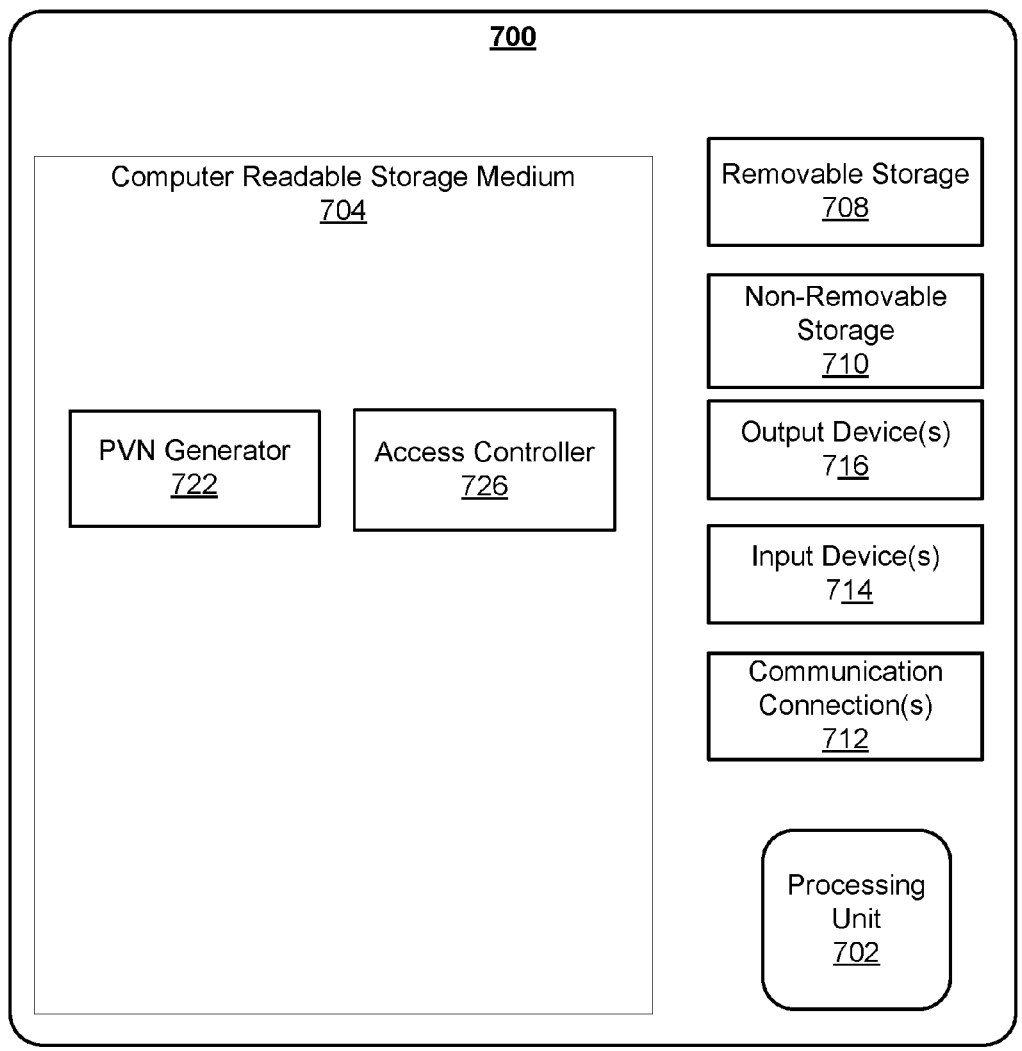
FIG. 7 shows an exemplary computer system in accordance with one embodiment.

Referring now to FIG. 7, a block diagram of an exemplary computer system in accordance with one embodiment of the present invention is shown. With reference to FIG. 7, an exemplary system module for implementing embodiments includes a general purpose computing system environment, such as computing system environment 700. Computing system environment 700 may include, but is not limited to, servers, switches, routers, desktop computers, laptops, tablets, mobile devices, and smartphones. In its most basic configuration, computing system environment 700 typically includes at least one processing unit 702 and computer readable storage medium 704. Depending on the exact configuration and type of computing system environment, computer readable storage medium 704 may be volatile (such as RAM), non-volatile (such as ROM, flash memory, etc.) or some combination of the two. Portions of computer readable storage medium 704 when executed facilitate PVN generation and control accessibility and level of access in accordance with embodiments herein (e.g., process 600).

Additionally, in various embodiments, computing system environment 700 may also have other features/functionality. For example, computing system environment 700 may also include additional storage (removable and/or non-removable) including, but not limited to, magnetic or optical disks or tape. Such additional storage is illustrated by removable storage 708 and non-removable storage 710. Computer storage media includes volatile and nonvolatile, removable and non-removable media implemented in any method or technology for storage of information such as computer readable instructions, data structures, program modules or other data. Computer readable medium 704, removable storage 708 and nonremovable storage 710 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

In some embodiments, computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 712 may allow computing system environment 700 to communicate over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 700 may also have input device(s) 714 such as keyboard, mouse, a terminal or terminal emulator (either connected or remotely accessible via telnet, SSH, http, SSL, etc.), pen, voice input device, touch input device, remote control, etc. Output device(s) 716 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, computer readable storage medium 704 includes a PVN generator 722 and an access controller module 726 operable to generate a dedicated PVN for each external device and to control accessibility and the level of access for each external device according to flow diagram 600, for instance.

It is appreciated that implementations according to embodiments of the present invention that are described with respect to a computer system are merely exemplary and not intended to limit the scope of the present invention. For example, embodiments of the present invention may be implemented on devices such as switches and routers, which may contain application specific integrated circuits (ASICs), field programmable gate arrays (FPGAs), etc. It is appreciated that these devices may include a computer readable medium for storing instructions for implementing a method according to flow diagram 600.

Figure 8:
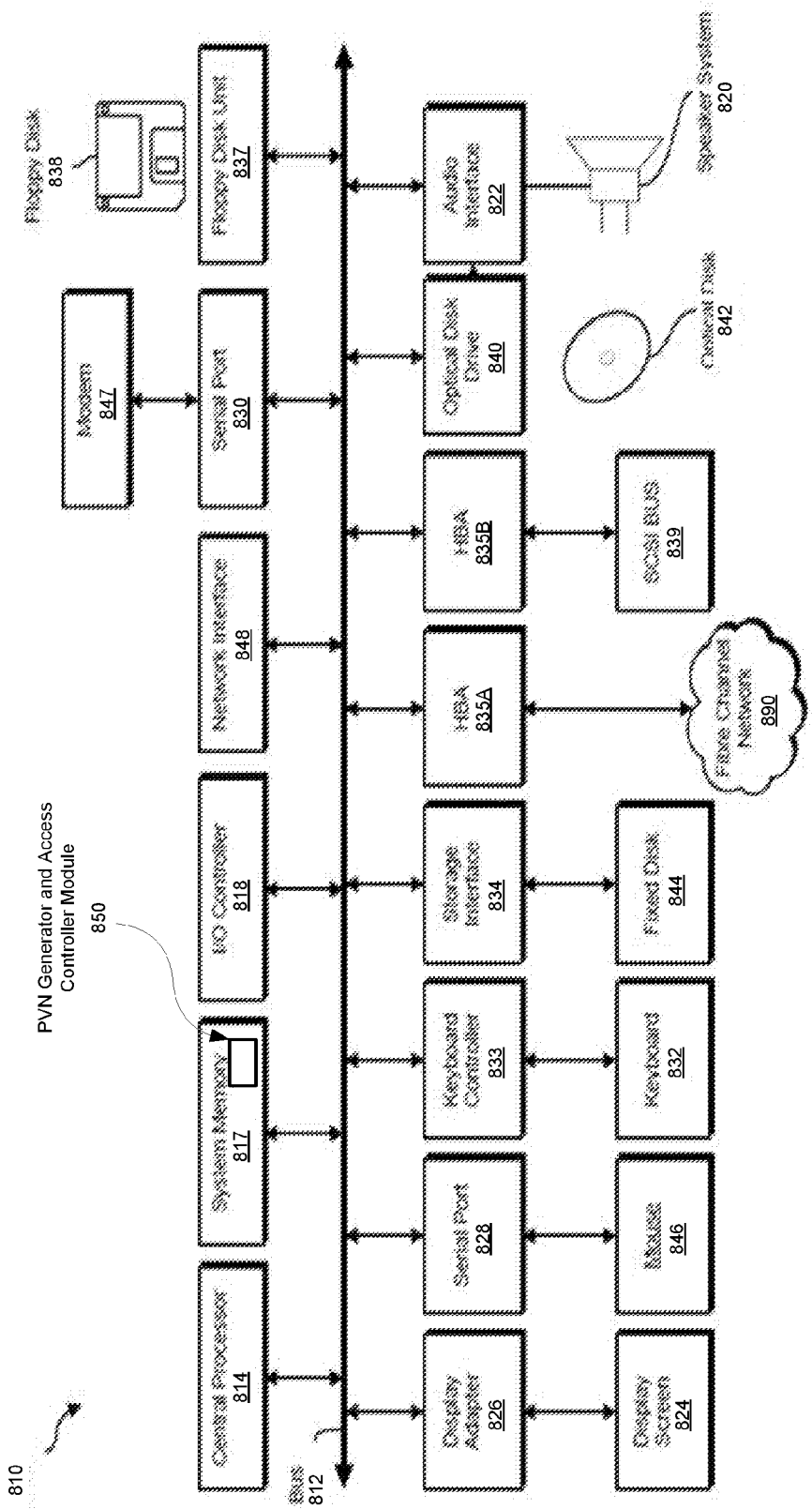
FIG. 8 shows a block diagram of another exemplary computer system in accordance with one embodiment.

Referring now to FIG. 8, a block diagram of another exemplary computer system in accordance with one embodiment of the present invention is shown. FIG. 8 depicts a block diagram of a computer system 810 suitable for implementing the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812). It is appreciated that the network interface 848 may include one or more Ethernet ports, wireless local area network (WLAN) interfaces, etc., but are not limited thereto. System memory 817 includes a PVN generation and access control module 850 which is operable to generate a dedicated PVN for each external device and further to control accessibility and level of access between each external device and other devices within the network. According to one embodiment, the PVN generation and access control module 850 may include other modules for carrying out various tasks. For example, PVN generation and access control module 850 may include the PVN generator 722 module and the access controller module 726, as discussed with respect to FIG. 7 above. It is appreciated that the PVN generation and access control module 850 may be located anywhere in the system and is not limited to the system memory 817. As such, residing of the PVN generation and access control module 850 within the system memory 817 is merely exemplary and not intended to limit the scope of the present invention. For example, parts of the PVN generator and access control module 850 may reside within the central processor 814 and/or the network interface 848 but are not limited thereto.

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Network interface 848 may provide multiple connections to other devices. Furthermore, modem 847 may provide a direct connection to a remote server via a telephone link or to the Internet via an internet service provider (ISP). Network interface 848 may provide one or more connection to a data network, which may include any number of networked devices. It is appreciated that the connections via the network interface 848 may be via a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A device comprising:
   a memory component configured to store information associated with network settings;
   a controller configured to control access of an external device of a network and an internal device of the network to one another; and
   a private virtual network (PVN) router within the network, wherein the PVN router is configured to receive a request signal from the external device to connect to the network and wherein the PVN router is further configured to receive another request signal from another external device to connect to the network, and wherein the PVN router is further configured to transmit a response signal to the external device and further configured to transmit another response signal to the another external device wherein the response signals are based on the network settings stored in the memory component and further based on the control access by the controller, wherein the response signal to the external device comprises a dedicated PVN to establish a connection between the external device and the network and wherein the response signal to the another external device comprises another dedicated PVN to establish another connection between the another external device and the network, wherein the external device is inaccessible by the internal device after the connection is established and wherein the external device is inaccessible by the another device after the connection and the another connections are established, and wherein the another external device is inaccessible by the internal device after the another connection is established and wherein the another external device is inaccessible by the external device after the another connection and the connection are established, and wherein the internal device is inaccessible by the external device after the connection is established and wherein the internal device is inaccessible by the another external device after the another connection is established.

2. The device of claim 1, wherein presence of the external device remains unknown by the internal device after the connection is established, and wherein presence of the internal device remains unknown by the external device after the connection is established.

3. The device of claim 1, wherein the memory component is configured to track devices connected to the network.

4. The device of claim 1, wherein the network settings comprises an internet protocol, subnet size, default gateway, routing tables, and domain name system services.

5. The device of claim 1, wherein the PVN router is further configured to receive a request from the external device, after the connection is established between the external device and the network, to provide access to the internal device, and wherein the controller is further configured to determine whether access to the internal device should be granted.

6. The device of claim 5, wherein the PVN router is further configured to provide a signal to the external device to enable the external device to access the internal device in response to a determination by the controller that access should be granted.

7. The device of claim 1, wherein the request signal from the external device to connect to the network is a provisioning request.

8. The device of claim 1, wherein the PVN router is further configured to automatically discover new devices.

9. The device of claim 1, wherein the dedicated PVN transmitted within a template to the external device.

10. The device of claim 1, wherein the control access of the external device by the controller is configurable by network administrator.

11. A method comprising:
    receiving a request for connecting an external device of a network to the network;
    transmitting a dedicated private virtual network (PVN) response to the external device;
    establishing a connection between the external device and the network, wherein the external device is inaccessible by an internal device of the network after the connection is established and wherein the internal device is inaccessible by the external device after the connection is established;
    receiving another request for connecting another external device to the network;
    transmitting another dedicated PVN response to the another external device; and
    establishing a connection between the another external device and the network, wherein the another external device is inaccessible by the internal device and the external device after the connection is established and wherein the internal device and the external device are inaccessible by the another external device after the connection is established.

12. The method of claim 11, wherein presence of the external device remains unknown by the internal device after the connection is established, and wherein presence of the internal device remains unknown by the external device after the connection is established.

13. The method of claim 11, wherein the dedicated PVN response is included in a template being transmitted and it includes an internet protocol, subnet size, default gateway, routing tables, and domain name system services.

14. The method of claim 11 further comprising:
receiving a request from the external device, after the connection is established between the external device and the network, to provide access to the internal device; and
determining whether access to the internal device should be granted.

15. The method of claim 14 further comprising:
granting access to the external device in response to determining that access should be granted.

16. The method of claim 14, wherein the determining whether to grant access is performed by a controller, and wherein the controller is dynamically configurable by a network administrator to modify access and a level of access.

17. The method of claim 11, wherein the external device is accessible by another internal device of the network after the connection is established and wherein the another internal device is accessible by the external device after the connection is established.

18. The method of claim 11 further comprising:
detecting another external device to be connected to the network.

19. A device comprising:
a database configured to store network settings information and further configured to track devices connected to a network;
a controller configured to control access of devices to one another after establishing a connection to the network; and
a private virtual network (PVN) router configured to receive a first provisioning request from a first requesting device to connect to the network and further configured to receive a second provisioning request from a second requesting device to connect to the network, wherein the PVN router is further configured to transmit a first provisioning response to the first requesting device based on instantiation of a PVN template received from the database and wherein the PVN router is further configured to transmit a second provisioning response to the second requesting device based on instantiation of the PVN template, wherein the PVN template is generated based on the network settings and further based on the control access determined by the controller, and wherein the provisioning response establishes a first connection between the first requesting device and the network and wherein the second provisioning response establishes a second connection between the second requesting device and the network, wherein the first requesting device is inaccessible by a first subset of devices already connected in the network after the first connection is established and wherein the first subset of devices is inaccessible by the first requesting device after the first connection is established and wherein the second requesting device is inaccessible by a second subset of devices already connected in the network after the second connection is established and wherein the second subset of devices is inaccessible by the second requesting device after the second connection is established, and wherein the first requesting device is inaccessible by the second requesting device and vice versa after the first and the second connection are established.

20. The device of claim 19, wherein the requesting device is accessible by another subset of devices already connected in the network after the connection is established and wherein the another subset of devices is accessible by the requesting device after the connection is established.

21. The device of claim 19, wherein the requesting device is invisible to the subset of devices and wherein the subset of devices is invisible to the requesting device.

22. The device of claim 19, wherein the controller is configurable in response to receiving instructions from a network administrator to modify accessibility of the requesting device to the subset of devices and vice versa prior to establishing the connection.

23. The device of claim 19, wherein the PVN router is configured to receive a request from the requesting device, after the connection is established, to grant access to another device connected to the network that is not in the subset of devices.

24. The device of claim 23, wherein the controller is configured to determine whether the requesting device should be given access to the another device connected to the network that is not in the subset of devices.

25. The device of claim 24, wherein the controller is configured to provide access to the requesting device in response to determining that the requesting device should be given access to the another device connected to the network that is not in the subset of devices.

26. The device of claim 19, wherein presence of the requesting device remains unknown by the subset of devices after the connection is established, and wherein presence of the subset of devices remains unknown by the requesting device after the connection is established.

27. The device of claim 19, wherein the PVN template comprises information regarding an internet protocol, subnet size, default gateway, routing tables, and domain name system services.

28. The device of claim 19, wherein the PVN router is further configured to automatically discover new devices.

* * * * *